United States Patent
Crow (10) Patent No.: US 8,427,487 B1
(45) Date of Patent: Apr. 23, 2013

(54) MULTIPLE TILE OUTPUT USING INTERFACE COMPRESSION IN A RASTER STAGE

(75) Inventor: Franklin C. Crow, Portola Valley, CA (US)

(73) Assignee: Nvidia Corporation, Santa Clara, CA (US)

(*) Notice: Subject to any disclaimer, the term of this patent is extended or adjusted under 35 U.S.C. 154(b) by 993 days.

(21) Appl. No.: 11/592,890

(22) Filed: Nov. 2, 2006

(51) Int. Cl.
*G06T 1/20* (2006.01)

(52) U.S. Cl.
USPC ............ 345/506; 345/501; 345/522; 345/537

(58) Field of Classification Search .................. 345/506, 345/426
See application file for complete search history.

(56) References Cited

U.S. PATENT DOCUMENTS

| | | | |
|---|---|---|---|
| 4,208,810 A | 6/1980 | Rohner et al. | |
| 4,918,626 A | 4/1990 | Watkins et al. | |
| 5,081,594 A | 1/1992 | Horsley | |
| 5,212,633 A | 5/1993 | Franzmeier | |
| 5,237,460 A | 8/1993 | Miller et al. | |
| 5,287,438 A | 2/1994 | Kelleher | |
| 5,313,287 A | 5/1994 | Barton | |
| 5,432,898 A | 7/1995 | Curb et al. | |
| 5,446,836 A | 8/1995 | Lentz et al. | |
| 5,452,104 A | 9/1995 | Lee | |
| 5,452,412 A | 9/1995 | Johnson, Jr. et al. | |
| 5,483,258 A | 1/1996 | Cornett et al. | |
| 5,543,935 A | 8/1996 | Harrington | |
| 5,570,463 A | 10/1996 | Dao | |
| 5,594,854 A | 1/1997 | Baldwin et al. | |
| 5,623,692 A | 4/1997 | Priem et al. | |
| 5,633,297 A | 5/1997 | Valko et al. | |
| 5,664,162 A | 9/1997 | Dye | |
| 5,815,162 A | 9/1998 | Levine | |
| 5,854,631 A | 12/1998 | Akeley et al. | |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

A Hardware Assisted Design Rule Check Architecture Larry Seller Jan. 1982 Proceedings of the 19th Conference on Design Automation DAC '82 Publisher: IEEE Press.

(Continued)

*Primary Examiner* — Xiao M. Wu
*Assistant Examiner* — Phi Hoang (57) ABSTRACT

A method and system for interface compression in a raster stage of a graphics processor. The method includes receiving a graphics primitive for rasterization in a raster stage of a graphics processor and rasterizing the graphics primitive at a first level in a coarse raster component to generate a plurality of tiles related to the graphics primitive. The method determines whether a window ID operation is required for the plurality of tiles. If the operation is required, a respective plurality of uncompressed coverage masks for the tiles are output from the coarse raster component to a fine raster component on a one coverage mask per clock cycle basis. If the operation is not required, a compressed coverage mask for the tiles is output in a single clock cycle. The tiles are subsequently rasterized at a second-level in the fine raster component to generate pixels related to the graphics primitive.

18 Claims, 6 Drawing Sheets

U.S. PATENT DOCUMENTS

| | | |
|---|---|---|
| 5,854,637 A | 12/1998 | Sturges |
| 5,872,902 A | 2/1999 | Kuchkuda et al. |
| 5,977,987 A | 11/1999 | Duluk, Jr. |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,557 A | 12/2000 | Narayanaswami |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,259,460 B1 | 7/2001 | Gossett et al. |
| 6,323,874 B1 | 11/2001 | Gossett |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,523,102 B1 | 2/2003 | Dye et al. |
| 6,525,737 B1 | 2/2003 | Duluk, Jr. et al. |
| 6,529,207 B1 | 3/2003 | Landau et al. |
| 6,545,684 B1 | 4/2003 | Dragony et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,704,022 B1 | 3/2004 | Aleksic |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,819,332 B2 | 11/2004 | Baldwin |
| 6,833,835 B1 | 12/2004 | van Vugt |
| 6,901,497 B2 | 5/2005 | Tashiro et al. |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,978,317 B2 | 12/2005 | Anantha et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,061,495 B1 | 6/2006 | Leather |
| 7,061,640 B1 | 6/2006 | Maeda |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,167,259 B2 | 1/2007 | Varga |
| 7,170,515 B1 | 1/2007 | Zhu |
| 7,184,040 B1 | 2/2007 | Tzvetkov |
| 7,224,364 B1 | 5/2007 | Yue et al. |
| 7,307,628 B1 | 12/2007 | Goodman et al. |
| 7,307,638 B2 | 12/2007 | Leather et al. |
| 7,382,368 B1 | 6/2008 | Molnar et al. |
| 7,453,466 B2 | 11/2008 | Hux et al. |
| 7,483,029 B2 | 1/2009 | Crow et al. |
| 7,548,996 B2 | 6/2009 | Baker et al. |
| 7,551,174 B2 | 6/2009 | Iourcha et al. |
| 7,633,506 B1 * | 12/2009 | Leather et al. ................ 345/506 |
| 7,634,637 B1 | 12/2009 | Lindholm et al. |
| 7,791,617 B2 | 9/2010 | Crow et al. |
| 7,965,902 B1 * | 6/2011 | Zelinka et al. ................ 382/284 |
| 8,063,903 B2 | 11/2011 | Vignon et al. |
| 2001/0005209 A1 | 6/2001 | Lindholm et al. |
| 2002/0050979 A1 | 5/2002 | Oberoi et al. |
| 2002/0097241 A1 | 7/2002 | McCormack et al. |
| 2002/0130863 A1 | 9/2002 | Baldwin |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0067468 A1 | 4/2003 | Duluk, Jr. et al. |
| 2003/0076325 A1 | 4/2003 | Thrasher |
| 2003/0122815 A1 | 7/2003 | Deering |
| 2003/0163589 A1 | 8/2003 | Bunce et al. |
| 2003/0194116 A1 | 10/2003 | Wong et al. |
| 2003/0201994 A1 | 10/2003 | Taylor et al. |
| 2004/0085313 A1 | 5/2004 | Moreton et al. |
| 2004/0130552 A1 * | 7/2004 | Duluk et al. ................... 345/506 |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0122338 A1 * | 6/2005 | Hong et al. .................... 345/546 |
| 2005/0134588 A1 | 6/2005 | Aila et al. |
| 2005/0134603 A1 | 6/2005 | Iourcha et al. |
| 2005/0179698 A1 | 8/2005 | Vijayakumar et al. |
| 2005/0259100 A1 | 11/2005 | Teruyama |
| 2006/0044317 A1 | 3/2006 | Bourd et al. |
| 2006/0170690 A1 | 8/2006 | Leather |
| 2006/0203005 A1 | 9/2006 | Hunter |
| 2006/0245001 A1 | 11/2006 | Lee et al. |
| 2006/0267981 A1 * | 11/2006 | Naoi .............................. 345/426 |
| 2007/0139440 A1 | 6/2007 | Crow et al. |
| 2007/0268298 A1 * | 11/2007 | Alben et al. ................... 345/530 |
| 2007/0273689 A1 * | 11/2007 | Tsao .............................. 345/422 |
| 2007/0296725 A1 * | 12/2007 | Steiner et al. ................. 345/505 |
| 2008/0024497 A1 | 1/2008 | Crow et al. |
| 2008/0024522 A1 * | 1/2008 | Crow et al. .................... 345/621 |
| 2008/0100618 A1 | 5/2008 | Woo et al. |
| 2008/0273218 A1 | 11/2008 | Kitora et al. |

FOREIGN PATENT DOCUMENTS

| | | |
|---|---|---|
| JP | 10-134198 | 5/1998 |
| JP | 11195132 | 7/1999 |
| JP | 2005182547 | 7/2005 |
| WO | 0013145 | 3/2000 |

OTHER PUBLICATIONS

A Parallel Alogorithm for Polygon Rasterization Juan Pineda Jun. 1988 ACM.

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press.

Blythe, OpenGL section 3.4.1, Basic Line Segment Rasterization, Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

* cited by examiner

MULTIPLE TILE OUTPUT USING INTERFACE COMPRESSION IN A RASTER STAGE

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms and various rasterization methods have been developed for computing from a graphics primitive based description to a pixel based description (e.g., rasterizing pixel to pixel per primitive) in a way such that all pixels within the primitives comprising a given 3-D scene are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive.

Other traditional methods involve utilizing per pixel evaluation techniques to closely evaluate each of the pixels comprising a display and determine which pixels are covered by which primitives. The per pixel evaluation involves scanning across the pixels of a display to determine which pixels are touched/covered by the edges of a graphics primitive.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920× 1200 pixels or larger. Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for interface compression in a raster stage of a graphics processor (e.g., GPU). The method includes receiving a graphics primitive (e.g., a triangle polygon) for rasterization in a raster stage of the GPU and rasterizing the graphics primitive at a first level in a coarse raster component to generate a plurality of tiles related to the graphics primitive. The method further includes determining whether a window ID operation is required for the plurality of tiles. If a window ID operation is required, a respective plurality of uncompressed coverage masks for the plurality of tiles are output from the coarse raster component to a fine raster component on a one coverage mask per clock cycle basis (e.g., one 64-bit coverage mask per tile, etc.). If a window ID operation is not required, a compressed coverage mask for the plurality of tiles is output in a single clock cycle (e.g., a single 64-bit compressed coverage mask for all of the tiles). The plurality of tiles are subsequently rasterized at a second-level in the fine raster component to generate a plurality of pixels related to the graphics primitive. In one embodiment, the compressed coverage mask includes compressed depth cull information for the plurality of tiles.

In one embodiment, the method includes determining whether a polygon stipple operation or a window ID operation is required for the plurality of tiles. If a polygon stipple or window ID operation is required, a respective plurality of uncompressed coverage masks for the plurality of tiles are output from the coarse raster component to a fine raster component on a one coverage mask per clock cycle basis (e.g., one 64-bit coverage mask per tile, etc.). If a polygon stipple or window ID operation is not required, a compressed coverage mask for the plurality of tiles is output in a single clock cycle (e.g., a single 64-bit compressed coverage mask for all of the tiles).

In one embodiment, a transfer interface is coupled between the coarse raster component and the fine raster component and is configured for transferring coverage masks from the coarse raster component to the fine raster component. The transfer interface has a size configured to accept one compressed coverage mask per clock cycle, or alternatively accept a plurality of uncompressed coverage masks on a one coverage mask per clock cycle basis.

In this manner, the interface compression method that can transfer a single compressed coverage mask for the plurality of tiles generated by the coarse raster component in a single clock cycle significantly reduces the amount of silicon die area that must be dedicated to a transfer interface between the coarse raster component and the fine raster component. The reduced silicon die area allows the performance of a raster stage to scale dramatically (e.g., with increased parallelism) without causing unnecessary bloat in the interfaces between components.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
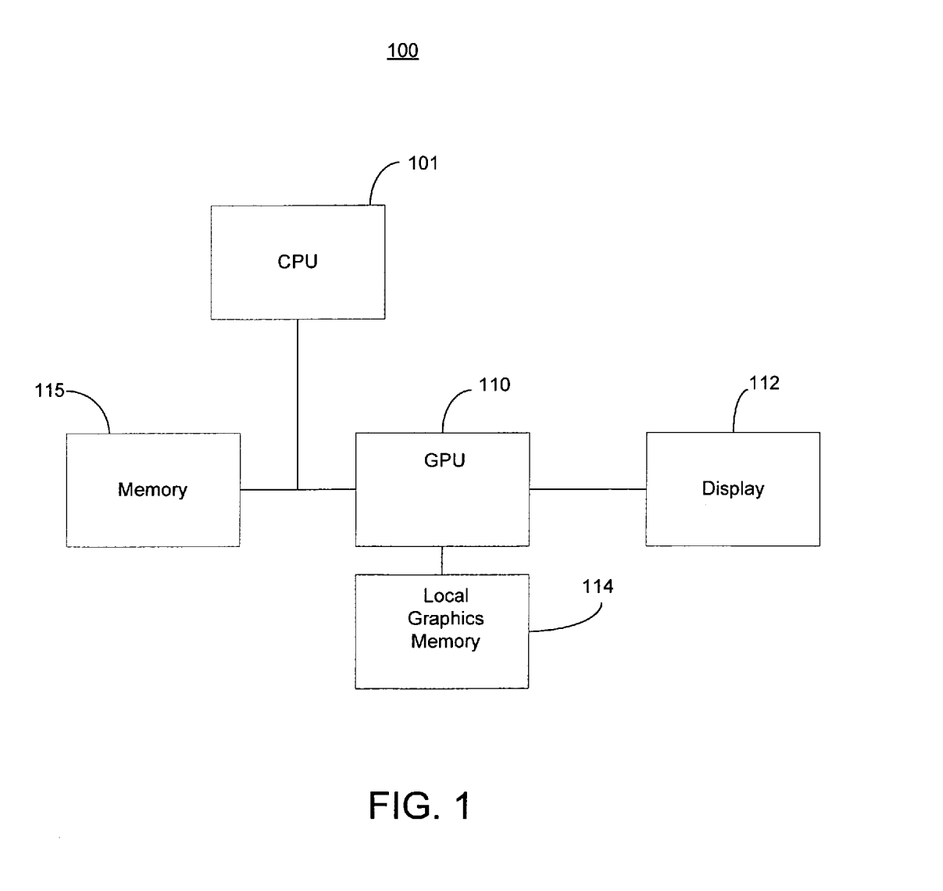
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, JO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

EMBODIMENTS OF THE INVENTION

Embodiments of the present invention implement a method and system for interface compression in a raster stage of a graphics processor (e.g., GPU 110 of FIG. 1). The method includes receiving a graphics primitive (e.g., a triangle polygon) for rasterization in a raster stage of the GPU 110 and rasterizing the graphics primitive at a first level in a coarse raster component to generate a plurality of tiles (e.g., four 8×8 tiles of pixels, etc.) related to the graphics primitive. A tile is considered related to the graphics primitive if it has at least some degree of coverage by a graphics primitive. The method further includes determining whether a window ID operation and/or a polygon stipple operation is required for the plurality of tiles. If a window ID/polygon stipple operation is required, a respective plurality of uncompressed coverage masks for the plurality of tiles are output from the coarse raster component to a fine raster component on a one coverage mask per clock cycle basis (e.g., one 64-bit coverage mask per 64 pixel tile, etc.). If a window ID/polygon stipple operation is not required, a compressed coverage mask for the plurality of tiles is output in a single clock cycle (e.g., a single 64-bit compressed coverage mask for all 256 pixels of the tiles). The plurality of tiles are subsequently rasterized at a second-level in the fine raster component to generate a plurality of pixels related to the graphics primitive (e.g., those pixels having at least some coverage). Embodiments of the present invention and their benefits are further described below.

Figure 2:
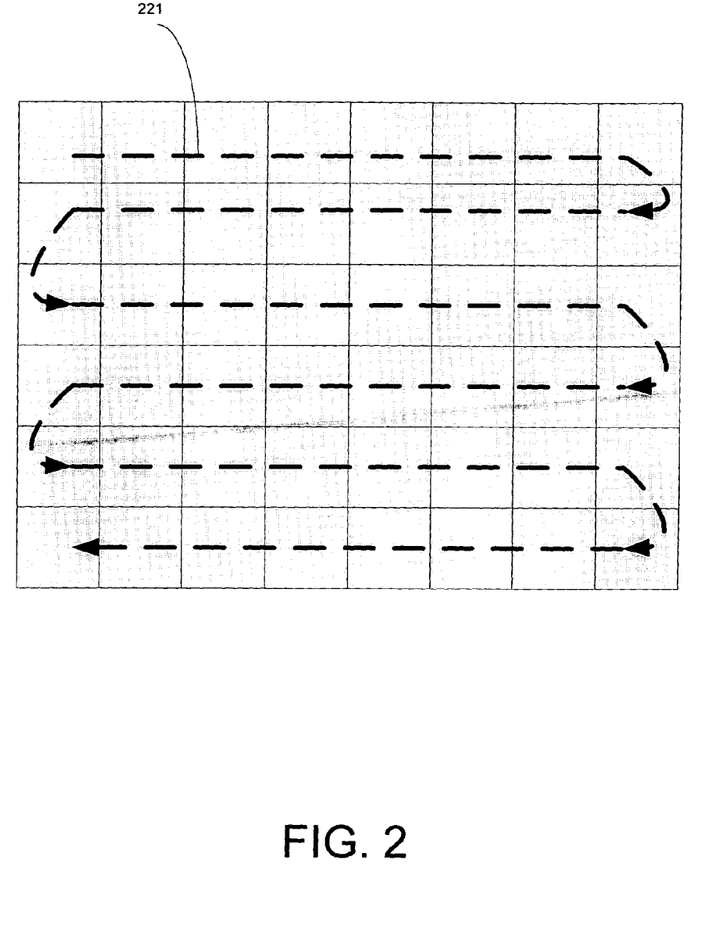
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive. As depicted in FIG. 2, the boustrophedonic pattern is indicated by the dotted line 221. In such an embodiment, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small. Additionally, it should be noted that the boustrophedonic traversal pattern can be implemented on a tile-by-tile basis (e.g., from a generated tile to a recently previously generated tile) as opposed to a pixel-by-pixel basis.

Referring still to FIG. 2, a boustrophedonic pattern for visiting the areas of the screen covered when rasterizing a large primitive (e.g., triangles, etc.) has advantages for maintaining a cache of relevant data and reducing the memory requests required for frame buffer and texture access. For example, generating pixels that are near recently generated pixels is important when recent groups of pixels and/or their corresponding texture values are kept in memories of a limited size (e.g., cache memories, etc.).

Additional details regarding boustrophedonic pattern rasterization can be found in U.S. patent application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing tile groups can be readily applied to traditional left-to-right, line-by-line rasterization patterns.

Figure 3:
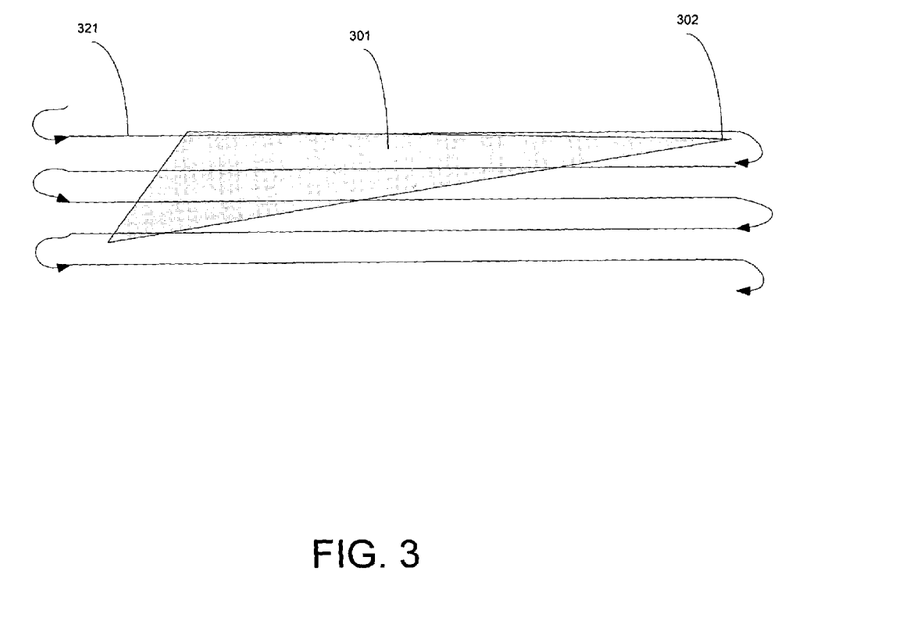
FIG. 3 shows a diagram of a triangle polygon against a rasterization pattern for a raster unit of a GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention.

As described above, the line 321 shows a boustrophedonic pattern of traversal, where the raster unit visits all pixels on a 2D area of the triangle 301 by scanning along one axis as each pass moves farther along on the orthogonal axis. In the FIG. 3 embodiment, this initial rasterization pattern is performed at the first level, or at a coarse rasterization level. A coarse raster unit of the GPU 110 traverses the triangle 301 and stamps out tiles that cover the triangle 301.

Figure 4:
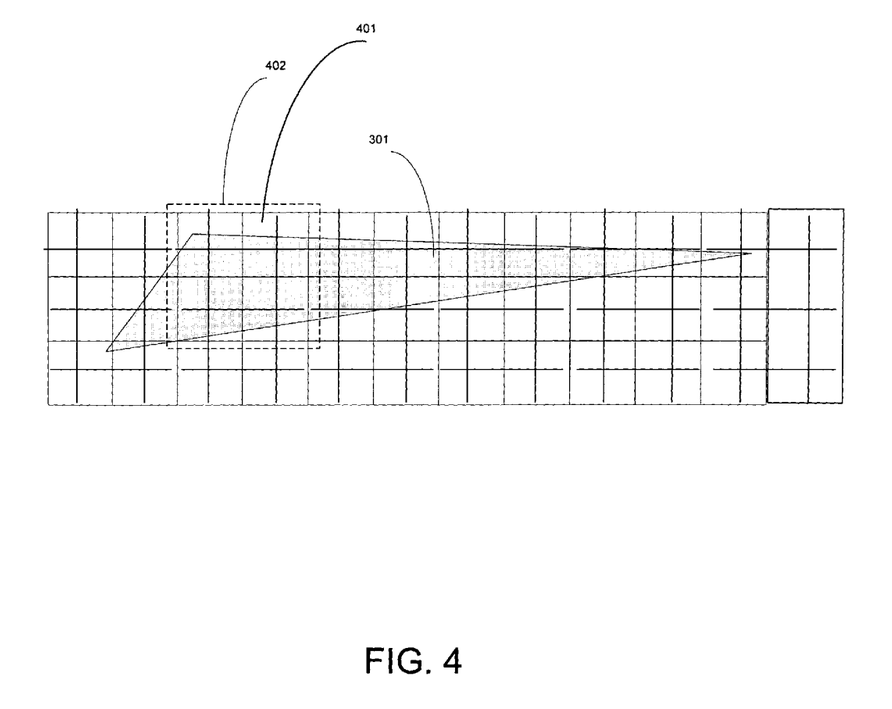
FIG. 4 shows a diagram of the triangle against a grid of tiles as they are being examined by the first level rasterization process in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 16×16, 8×8, etc.). FIG. 4 shows a case where the first level rasterization produces 16 tiles (e.g., comprised of 8×8 pixels each) such as the exemplary tile group 402. An exemplary one tile 401 of the group 402 is indicated. It should be noted that a greater or lesser number of tiles can be produced by the coarse raster unit per clock cycle (e.g., eight 8×8 tiles, 24 8×8 tiles, etc.). Similarly, it should be noted that a greater or lesser number of pixels can comprise each tile (e.g., 16×16 pixels per tile, 24×24, 32×32, etc.).

As described above, in one embodiment, the first level rasterization generates a tile (e.g., tile 401) comprising a set of pixels related to the graphics primitive (e.g., a tile that has at least some coverage with respect to the primitive). Generally, the first level rasterization is intended to quickly determine which pixels of the screen area relate to a given graphics primitive. Accordingly, relatively large groups of pixels (e.g., tiles) are examined at a time in order to quickly find those pixels that relate to the primitive. The process can be compared to a reconnaissance, whereby the coarse raster unit quickly scans a screen area and finds tiles that cover the triangle 301. Thus the pixels that relate to the triangle 301 can be discovered much more quickly than the traditional prior art process which utilizes a single level of rasterization and examines much smaller numbers of pixels at a time, in a more fine-grained manner.

Figure 5:
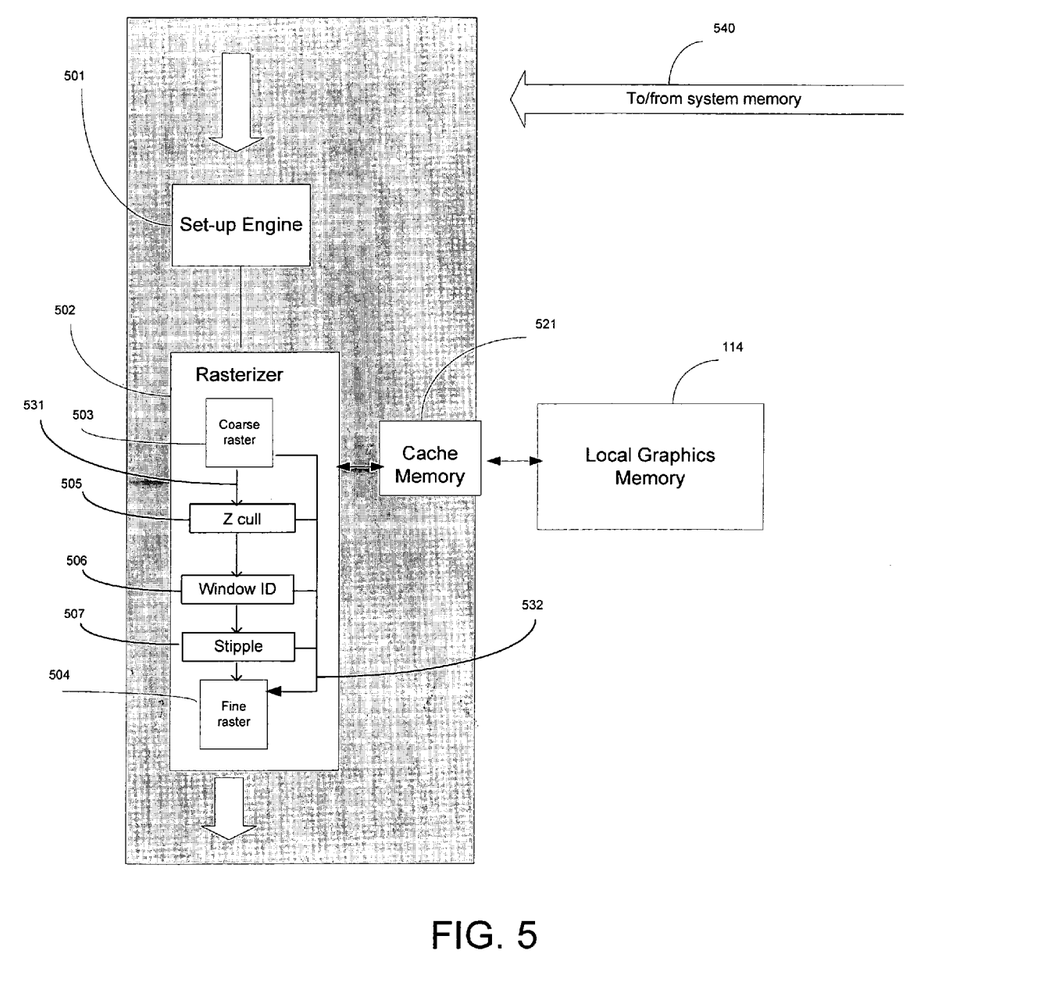
FIG. 5 shows a diagram of internal components of a GPU in accordance with one embodiment of the present invention.

FIG. 5 shows a diagram of internal components of the GPU 110 in accordance with one embodiment of the present invention. As shown in FIG. 5, the GPU 110 includes a setup unit 501 and a rasterizer unit 502. In the present embodiment, the functionality of the present invention is implemented within the hardware and software of the rasterizer unit 502. Generally, the set up unit 501 functions by converting descriptions based on vertices to descriptions based on edge descriptions. The rasterizer unit 502 subsequently converts these edge descriptions into filled areas comprising actual pixel descriptions (e.g., pixel areas, pixel sub-samples, etc.) and coverage masks. The pixel descriptions are subsequently passed along to other units within the GPU 110 for further processing and rendering.

In the FIG. 5 embodiment, the rasterizer unit 502 includes a coarse raster component 503 and a fine raster component 504. The coarse raster component 503 implements the tile based rasterization process as described above, as it rapidly searches a grid of tiles to identify tiles of interest (e.g., tiles that are covered by a primitive). Once the related tiles are identified, the fine raster component 504 individually identifies the pixels that are covered by the primitive. Hence, in such an embodiment, the coarse raster component 503 rapidly searches a grid of pixels by using tiles, and the fine raster component 504 uses the information generated by the coarse raster component 503 and implements fine granularity rasterization by individually identifying pixels covered by the primitive.

Referring still to FIG. 5, the GPU 110 further includes a cache memory 521 that functions by implementing high-speed low latency storage for the most frequently used graphics rendering data. Such data typically comprises texture information, vertex information, colors, and the like. The cache memory 521 is shown coupled to the local graphics memory 114. The cache memory 521 utilizes one or more cache maintenance mechanisms to maintain coherency with the local graphics memory 114. The arrow 540 shows the communications pathway between the GPU 110 and the system memory (e.g., memory 115 shown in FIG. 1).

In one embodiment, the hardware comprising the raster unit 502 is optimized for operations on a per clock basis. For example, to provide high throughput and thereby maintain high rendering frame rates, the coarse raster component 503 and the fine raster component 504 comprise hardware designed to implement the first level rasterization and the second level rasterization on a per-clock cycle basis. The rasterizer unit 502 can be implemented such that the first level rasterization is implemented in the coarse raster component 503 that "stamps out" tiles covering a given primitive within a single clock cycle. Subsequently, the rasterization at the second level can be implemented in the fine raster component 504 that stamps out the covered pixels of a tile in a single clock cycle.

In the FIG. 5 embodiment, the raster unit 502 includes a depth cull component 505, a window ID component 506, a polygon stipple component 507, and a fine raster component 504. The coarse raster component 503 implements the tile based rasterization process as described above, as it rapidly searches a grid of tiles to identify tiles of interest. The depth cull component 505, sometimes referred to as the Z cull component, examines the tiles identified by the coarse raster component 503 and functions by discarding, or culling, the pixels comprising those portions of the graphics primitive that are covered by, or are otherwise occluded by, other graphics primitives. Such portions will ultimately not be displayed and should not be further processed. The depth cull information is captured through the generation of a depth cull coverage mask. This coverage mask indicates those pixels, or groups of pixels, of a given tile that are turned off because they are occluded, or otherwise behind another graphics primitive.

The window ID component 506 examines the tiles identified by the coarse raster component 503 and functions by turning off those pixels that are not associated with a given window of interest. Such a window could comprise, for example, one of several windows on a computer screen as displayed by one or more applications, were each window is associated with a designated window identifier (e.g., window ID) as described in, for example, the OpenGL specification.

The polygon stipple component 507 examines the tiles identified by the coarse raster component and functions by turning off those pixels that are impacted by a polygon stipple operation. As with the window ID component 506, the polygon stipple component 507 compiles its information into a polygon stipple coverage mask.

Thus, for example, once the related tiles are identified by the coarse raster component 503, those pixels of each tile that are turned off as a result of the depth cull operation, window ID operation, and polygon stipple operation are identified by combining the respective coverage masks into a combined coverage mask, typically one combined coverage mask per tile, that indicates which pixels of the tile are turned off/on. This combined coverage mask is transferred to the fine raster component 504 and is used by the fine raster component 504 in its second level fine rasterization process as it stamps out individual covered pixels of the tile that have not been killed by depth culling, window ID, or polygon stipple.

In one embodiment, the combined coverage mask indicates which tiles identified by the coarse raster component 503 have all of their constituent pixels turned off and can therefore be discarded. Discarding such dead tiles reduces the amount of work that must be performed by the fine raster component 504. For example, in a case where the coarse raster component 503 works with tile groups comprising 1024 pixels (e.g., a 32×32 block of pixels with 16 tiles of 64 pixels each), those tiles having all of their constituent pixels turned off as indicated by the combined coverage mask can be completely discarded. Those tiles having at least some coverage from the graphics primitive and have at least one pixel that has not been turned off are passed on to the fine raster component 504 for further processing.

In one embodiment, the rasterizer unit 502 can preferably take advantage of those cases where rendering operations do not require either window ID operations or polygon stipple operations. In those cases, there are no respective coverage masks resulting from the window ID operation from the window ID component 506, or from the polygon stipple operation from the polygon stipple component 507. However, there would still be a coverage mask from the depth cull component 505. The combined coverage mask would thus be essentially the coverage mask from the depth cull component 505.

In situations where no window ID operations or polygon stipple operations occur, the information comprising the coverage mask generated by depth cull component 505 can be compressed such that the depth cull information for a multiple tile group (e.g., a four tile group) can be captured using a single coverage mask. For example, normally each tile is associated with a coverage mask having one bit per pixel of the tile (e.g., a 64-bit coverage mask for each of the pixels of an 8×8 tile). The depth information can be compressed by utilizing one bit of the coverage mask to represent more than one pixel. For example, in one embodiment, each bit of a coverage mask can be used to present an 8×2 region of pixels. In such an embodiment, a single coverage mask can contain the depth information for four 8×8 tiles. This allows the transmission of a single coverage mask representing four tiles to the fine raster unit 504 in a single clock cycle.

Thus, as shown in FIG. 5, in one embodiment four tiles can be transmitted from the coarse raster component 503 the fine raster component 504 via the pipeline 531, while simultaneously, a compressed combined coverage mask representing all four tiles can be transmitted along a transfer interface 532. This compressed combined coverage mask can be transmitted via the transfer interface 532, along with all four tiles via the pipeline 531, in a single clock cycle from the coarse raster component 503 to the fine raster component 504.

Additionally, it should be noted that compression can also be implemented in those cases where both window ID and polygon stipple operations result in zero killed pixels. This would generate a combined coverage mask with full coverage. Similarly, compression can be implemented when window ID provides full coverage and there is no polygon stipple operation, or vice-versa when polygon stipple provides full coverage and there is no window ID operation.

Alternatively, if either window ID operations are used or polygon stipple operations are used (e.g., where there is at least one killed pixel), the combined coverage mask must be transmitted in an uncompressed form. As described above, in the uncompressed form, one combined coverage mask is transmitted per clock cycle, per tile.

Thus, for example, in a case where window ID operations and polygon stipple operations are relatively rare, the raster unit 502 can have a transfer interface 532 it is optimized for the transfer of compressed combined coverage masks. Continuing the above example, the transfer interface 532 can be sized to handle 64-bit coverage masks, and the pipeline 531 can transfer four tiles per cycle and a corresponding 64-bit coverage mask representing all four tiles per cycle. This allows the raster unit 502 to quickly crunch through large-screen areas, efficiently stamping out pixels for further processing by subsequent stages of the graphics pipeline. For those rare occasions when window ID operations and/or polygon stippling operations are required, the raster unit 502 can slow down, and send the four tiles down one per clock cycle with a corresponding respective combined coverage mask one per clock cycle. The combined coverage masks would use the same 64-bit transfer interface 532.

Figure 6:
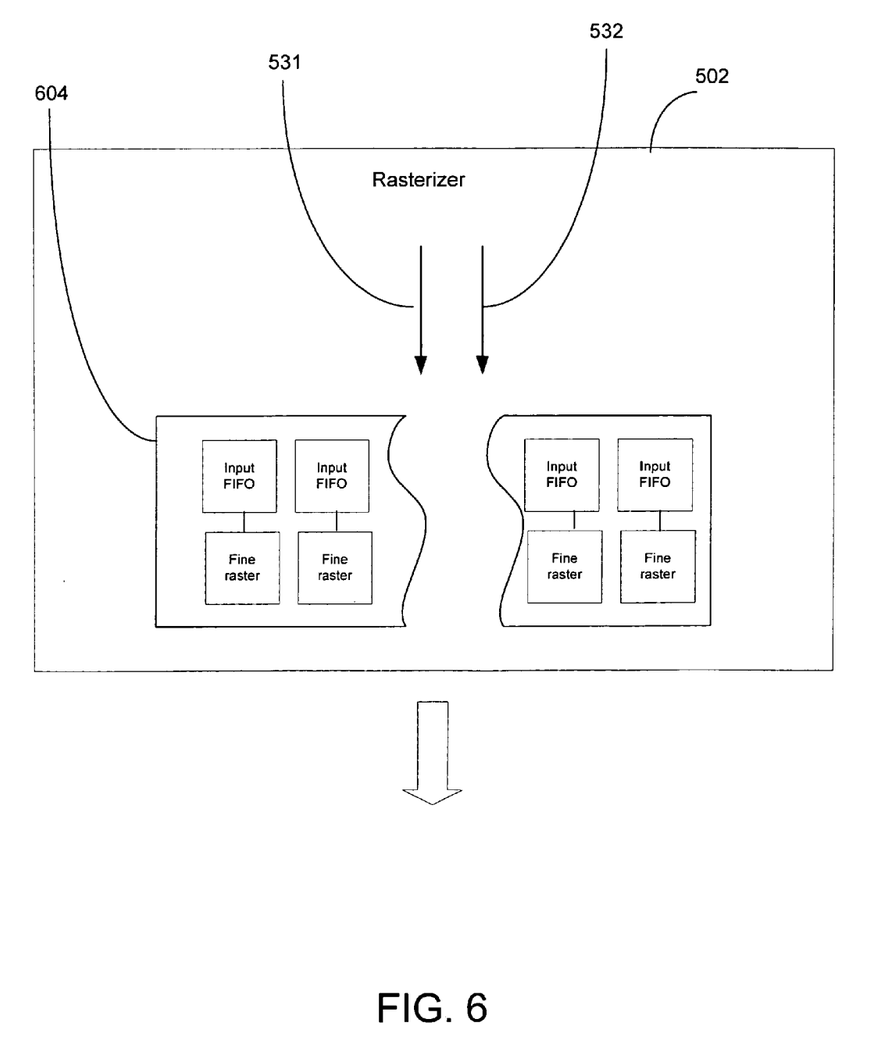
FIG. 6 shows a diagram depicting the rasterizer incorporating a parallel fine raster component in accordance with one embodiment of the present invention.

FIG. 6 shows a diagram depicting the rasterizer 502 incorporating a parallel fine raster component 604 in accordance with one embodiment of the present invention. As depicted in FIG. 6, the parallel fine raster component 604 includes a plurality of input FIFOs and a corresponding plurality of fine raster modules, as shown. The parallel fine raster component 604 illustrates a case where multiple fine raster modules and their associated FIFOs work on a large number of tiles in parallel. The FIFOs function by queuing input work for each of the parallel fine raster modules. FIG. 6 shows eight parallel fine raster modules and their associated FIFOs, however it should be noted that a lesser or larger number of parallel fine raster modules can be implemented.

For example, in one embodiment, the coarse raster component (e.g., coarse raster component 503 of FIG. 5) can generate 32 tiles per cycle and can output all 32 tiles to eight parallel fine raster modules by sending four tiles to each fine raster module per clock cycle. In this embodiment, the pipeline 531 is sized to send 32 tiles per cycle. The corresponding transfer interface 532 would be sized to transfer only eight combined coverage masks per cycle. In those cases where there are no window ID operations or polygon stipple operations, 32 tiles and eight combined coverage masks are output to the parallel fine raster component 604 per clock. In those cases where there are window ID operations and/or polygon stipple operations, the rasterizer unit 502 slows down, and transfers the 32 tiles at eight tiles per clock with eight combined coverage masks per clock, taking four clock cycles to transfer the 32 tile group.

In this manner, the multi-tile interface compression method of embodiments of the present invention can transfer a single compressed coverage mask for a plurality of tiles generated by the coarse raster component in a single clock cycle, thereby significantly reducing the amount of silicon die area that must be dedicated to a transfer interface (e.g., transfer interface 532) between the coarse raster component and the fine raster component. The reduced silicon die area allows the performance of a raster stage to scale dramatically with increased parallelism without causing unnecessary bloat in the interfaces between components.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for interface compression in a raster stage of a graphics processor, comprising:

receiving a graphics primitive for rasterization in a raster stage of a graphics processor;

rasterizing the graphics primitive at a first level in a coarse raster component to generate a plurality of tiles related to the graphics primitive;

determining whether a window ID operation is required for the plurality of tiles;

if a window ID operation is required, outputting a respective plurality of uncompressed coverage masks for the plurality of tiles from the coarse raster component to a fine raster component on a one coverage mask per clock cycle basis, wherein a transfer interface is coupled between the coarse raster component and the fine raster component and is for transferring coverage masks from the coarse raster component to the fine raster component, the transfer interface having a size configured to accept one compressed coverage mask per clock cycle;

if a window ID operation is not required, outputting a compressed coverage mask for the plurality of tiles in a single clock cycle; and rasterizing the plurality of tiles at a second-level in the fine raster component to generate a plurality of pixels related to the graphics primitive.

2. The method of claim 1, further comprising:

determining whether a polygon stipple operation is required for the plurality of tiles;

if a polygon stipple operation is required, outputting the respective plurality of uncompressed coverage masks for the plurality tiles from the coarse raster component to the fine raster component on a one coverage mask per clock cycle basis.

3. The method of claim 1, wherein the size of the transfer interface can alternatively accept a plurality of uncompressed coverage masks on a one coverage mask per clock cycle basis.

4. The method of claim 1, wherein the compressed coverage mask comprises compressed depth cull information for the plurality of tiles from the coarse raster component.

5. The method of claim 1, wherein each of the uncompressed coverage masks comprises uncompressed depth cull information.

6. The method of claim 1, wherein each of the uncompressed coverage masks further comprises window ID information combined with depth cull information.

7. In a GPU (graphics processor unit) a method for interface compression in a raster stage, comprising:
receiving a graphics primitive for rasterization in a raster stage of a graphics processor;
rasterizing the graphics primitive at a first level in a coarse raster component to generate a plurality of tiles related to the graphics primitive;
determining whether a polygon stipple operation is required for the plurality of tiles;
if a polygon stipple operation is required, outputting a respective plurality of uncompressed coverage masks for the plurality of tiles from the coarse raster component to a fine raster component on a one coverage mask per clock cycle basis, wherein a transfer interface is coupled between the coarse raster component and the fine raster component and is for transferring coverage masks from the coarse raster component to the fine raster component, the transfer interface having a size configured to accept one compressed coverage mask per clock cycle;
if a polygon stipple operation is not required, outputting a compressed coverage mask for the plurality of tiles in a single clock cycle; and
rasterizing the plurality of tiles at a second-level in the fine raster component to generate a plurality of pixels related to the graphics primitive.

8. The method as described in claim 7, further comprising:
determining whether a window ID operation is required for the plurality of tiles;
if a window ID operation is required, outputting the respective plurality of uncompressed coverage masks for the plurality tiles from the coarse raster component to the fine raster component on a one coverage mask per clock cycle basis.

9. The method as described in claim 7, wherein a transfer interface is coupled between the coarse raster component and the fine raster component and is for transferring coverage masks from the coarse raster component to the fine raster component.

10. The method as described in claim 9, wherein a size can alternatively accept a plurality of uncompressed coverage masks on a one coverage mask per clock cycle basis.

11. The method as described in claim 7, wherein the compressed coverage mask comprises compressed depth cull information for the plurality of tiles from the coarse raster component.

12. The method as described in claim 7, wherein each of the uncompressed coverage masks comprises uncompressed depth cull information.

13. The method as described in claim 7, wherein each of the uncompressed coverage masks further comprises window ID information combined with depth cull information.

14. A computer system, comprising:
a system memory;
a central processor unit coupled to the system memory; and
a graphics processor unit communicatively coupled to the central processor unit;
a set-up unit within the graphics processor unit for generating polygon descriptions;
a rasterizer unit within the graphics processor unit and coupled to the set-up unit for rasterizing the polygon descriptions;
a coarse raster component within the rasterizer unit for rasterizing the polygon descriptions at a first level to generate a plurality of tiles related to the graphics primitive; and
a fine raster component within the rasterizer unit for rasterizing the plurality of tiles at a second-level to generate a plurality of pixels related to the graphics primitive, wherein upon determining whether a window ID operation or a polygon stipple operation is required for the plurality of tiles:
the coarse raster component outputs a respective plurality of uncompressed coverage masks for the plurality of tiles to the fine raster component on a one coverage mask per clock cycle basis if a window ID operation or polygon stipple operation is required, wherein a transfer interface is coupled between the coarse raster component and the fine raster component and is for transferring coverage masks from the coarse raster component to the fine raster component, the transfer interface having a size configured to accept one compressed coverage mask per clock cycle; and
the coarse raster component outputs a compressed coverage mask for the plurality of tiles in a single clock cycle to the fine raster component if a window ID operation or polygon stipple operation is not required.

15. The computer system of claim 14, further comprising:
a transfer interface coupled between the coarse raster component and the fine raster component and for transferring coverage masks from the coarse raster component to the fine raster component.

16. The computer system of claim 15, wherein a size can alternatively accept a plurality of uncompressed coverage masks on a one coverage mask per clock cycle basis.

17. The computer system of claim 14, wherein the compressed coverage mask comprises compressed depth cull information for the plurality of tiles from the coarse raster component.

18. The computer system of claim 14, wherein each of the uncompressed coverage masks comprises uncompressed depth cull information combined with window ID information or polygon stipple information.

* * * * *